United States Patent
Sundhar et al.

(10) Patent No.: US 9,774,618 B2
(45) Date of Patent: Sep. 26, 2017

(54) METHODS, SYSTEMS, AND COMPUTER READABLE MEDIA FOR ASSESSING ATTACK VULNERABILITY OF RADIO ACCESS NETWORK EQUIPMENT

(71) Applicant: Ixia, Calabasas, CA (US)

(72) Inventors: Kalyan R. Sundhar, Cary, NC (US); Bijith Raghunandan Rao, Flower Mound, TX (US)

(73) Assignee: Ixia, Calabasas, CA (US)

( * ) Notice: Subject to any disclaimer, the term of this patent is extended or adjusted under 35 U.S.C. 154(b) by 0 days.

(21) Appl. No.: 14/984,359

(22) Filed: Dec. 30, 2015

(65) Prior Publication Data
US 2017/0195357 A1    Jul. 6, 2017

(51) Int. Cl.
| H04W 24/04 | (2009.01) |
| H04L 29/06 | (2006.01) |
| H04W 12/12 | (2009.01) |
| H04W 24/06 | (2009.01) |
| H04W 88/08 | (2009.01) |

(52) U.S. Cl.
CPC ...... *H04L 63/1433* (2013.01); *H04L 63/1458* (2013.01); *H04W 12/12* (2013.01); *H04W 24/06* (2013.01); *H04W 88/08* (2013.01)

(58) Field of Classification Search
CPC ..... H04W 24/10; H04L 1/0026; H04B 7/0626
USPC .... 455/423, 424, 67.11, 67.12, 67.14, 115.1, 455/115.2, 115.3
See application file for complete search history.

(56) References Cited

U.S. PATENT DOCUMENTS

| 8,737,980 | B2* | 5/2014 | Doshi | H04W 24/06 455/418 |
| 2007/0019769 | A1* | 1/2007 | Green | H04W 24/00 375/360 |
| 2009/0320137 | A1 | 12/2009 | White et al. | |
| 2011/0124295 | A1* | 5/2011 | Mahjoubi Amine | H04B 17/0087 455/67.14 |
| 2011/0263215 | A1* | 10/2011 | Asplund | H04W 24/06 455/115.1 |
| 2014/0092771 | A1* | 4/2014 | Siomina | H04W 24/08 370/252 |

(Continued)

OTHER PUBLICATIONS

Khosroshahy et al., "Botnets in 4G Cellular Networks: Platforms to Launch DDoS Attacks Against the Air Interface," 2013 International Conference on Selected Topics in Mobile and Wireless Networking, Montreal, Canada, DOI: 10.1109/MoWNet.2013. 6613793 (Aug. 19-21, 2013).

*Primary Examiner* — Cong Tran
(74) *Attorney, Agent, or Firm* — Jenkins, Wilson, Taylor & Hunt, P.A.

(57) ABSTRACT

The subject matter described herein relates to methods, systems, and computer readable media for assessing attack vulnerability of radio access network equipment. One method for assessing the attack vulnerability of a radio access network device includes emulating at least one good UE. The method further includes emulating at least one bad UE. The method further includes transmitting traffic from the emulated good and bad UEs to a non-simulated radio access network device under test. The method further includes monitoring a response of the radio access network device under test to the emulated good UEs. The method further includes generating output indicative of attack vulnerability of the device under test.

17 Claims, 6 Drawing Sheets

(56) References Cited

U.S. PATENT DOCUMENTS

2014/0341052 A1* 11/2014 Devarasetty .......... H04W 24/08
370/252
2016/0014625 A1* 1/2016 Devarasetty .......... H04W 24/06
370/252

* cited by examiner

METHODS, SYSTEMS, AND COMPUTER READABLE MEDIA FOR ASSESSING ATTACK VULNERABILITY OF RADIO ACCESS NETWORK EQUIPMENT

TECHNICAL FIELD

The subject matter described herein relates to testing network devices. More particularly, the subject matter described herein relates to methods, systems, and computer readable media for assessing attack vulnerability of cellular radio access network equipment.

BACKGROUND

In mobile communications networks, it is desirable to evaluate the vulnerability of the networks to attacks. For example, in LTE networks, when one or more user equipment (UEs) are hacked, malicious software can be installed on the UEs and used to send attack traffic to network devices, such as eNode Bs. Such attacks can degrade voice quality of voice calls and also reduce bandwidth available for allocation to other users. Because network operators desire to provide high quality of service to their subscribers, it is desirable to assess the vulnerability of network equipment to such attacks.

One conventional mechanism for assessing the attack vulnerability of network equipment is to run simulations of network attacks where simulated UEs communicate with a simulated network device under test and to monitor the performance of the simulated device under test in response to the attacks. While simulations may provide some indication of attack vulnerability, results are limited by the accuracy with which the device is simulated. Real network devices may behave differently than simulated devices in response to an attack. As a result, simulations may not provide an accurate indication of the attack vulnerability of real network devices.

In light of these difficulties, there exists a need for methods, systems, and computer readable media for assessing attack vulnerability of radio access network equipment.

SUMMARY

The subject matter described herein relates to methods, systems, and computer readable media for assessing attack vulnerability of radio access network equipment. One method for assessing the attack vulnerability of a radio access network device includes emulating at least one good UE. The method further includes emulating at least one bad UE. The method further includes transmitting traffic from the emulated good and bad UEs to a real air interface network device under test. The method further includes monitoring a response of the air interface network device under test to the emulated good UEs. The method further includes generating output indicative of attack vulnerability of the device under test.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
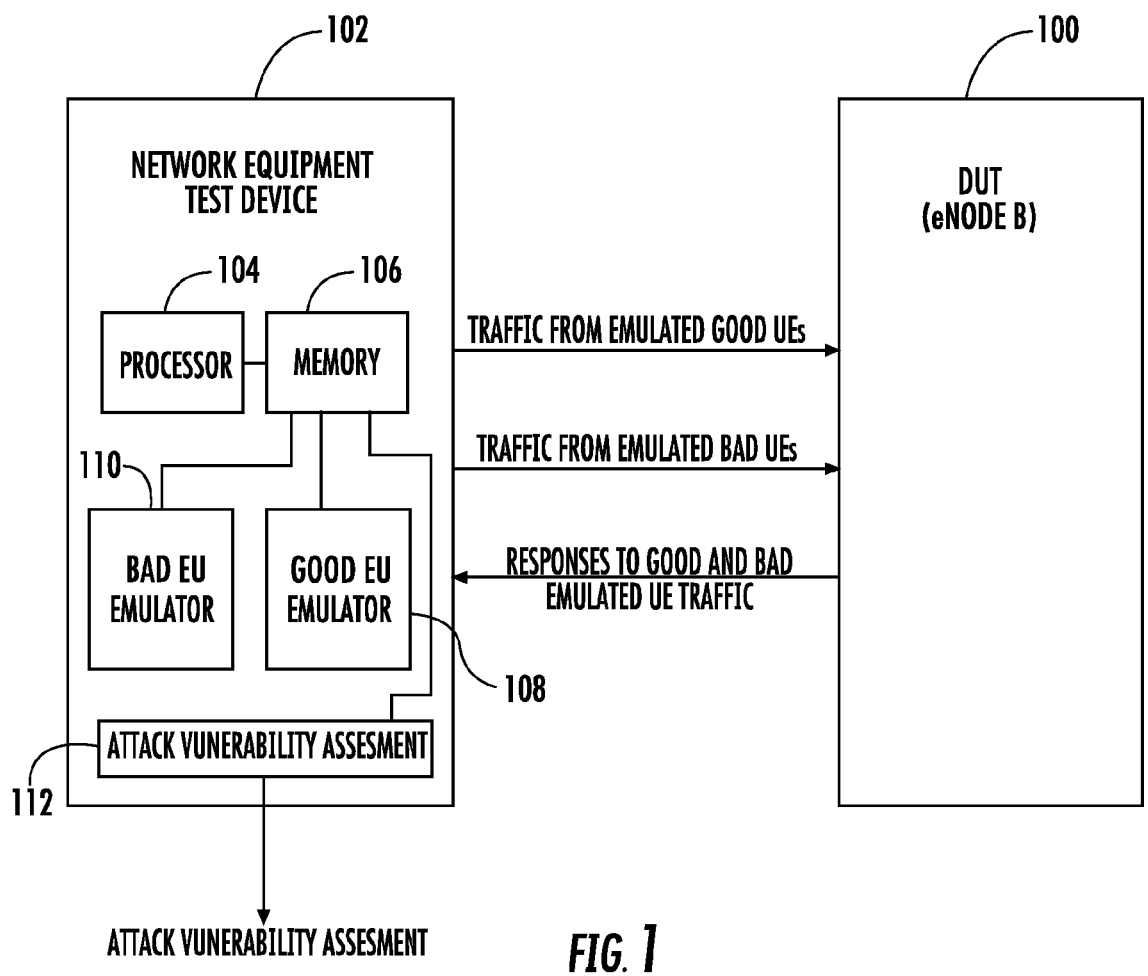
FIG. 1 is a block diagram illustrating an exemplary network equipment test device for emulating good and bad UEs and assessing the attack vulnerability of an air interface network device under test according to an embodiment of the subject matter described herein.

FIG. 1 is a block diagram illustrating a system for assessing the attack vulnerability of a radio access network device under test. Referring to FIG. 1, a radio access network device, such as an eNode B 100 comprises a real network device (i.e., a non-simulated device) that is configured to interface with UEs over the radio access network. eNode B 100 may interface with UEs using an LTE interface protocol or other suitable radio access protocol. A network equipment test device 102 includes a processor 104 and a memory 106. Processor 104 may be a physical processor including one or more cores that perform the functions described herein for assessing the attack vulnerability of real radio access network equipment. Memory 106 may be random access memory that stores programs for controlling processor 104 to implement the processes described herein for assessing the attack vulnerability of real radio access network equipment. In the illustrated example, network equipment test device 102 includes a good UE emulator 108 for emulating the behavior of one or more good UEs and a bad UE emulator 110 for emulating the behavior of one or more bad UEs. A good UE, as described herein, is a UE that is not designed to generate an attack on device under test 100. A bad UE, as described herein, is a UE that is configured for the purpose of generating an attack on device under test 100. Generating an attack may include transmitting messages or message parameters to device under test 100 for the purpose of degrading performance of device under test 100. Examples of good and bad UE behavior will be described in more detail below.

Network equipment test device 102 further includes an attack vulnerability assessment module 112. Attack vulnerability assessment module 112 monitors responses to the good emulated UE traffic and generates output indicative of the attack vulnerability of device under test 100. In one example, attack vulnerability assessment module 112 may monitor the bandwidth available to good UEs during an attack and before and after the attack. In such an example, attack vulnerability assessment module 112 may generate a report that indicates the bandwidth available to the good UEs during the attack and before and after the attack. In another example, attack vulnerability assessment module 112 may generate a report indicative of call quality available to the good UEs during the attack and before or after the attack.

Figure 2:
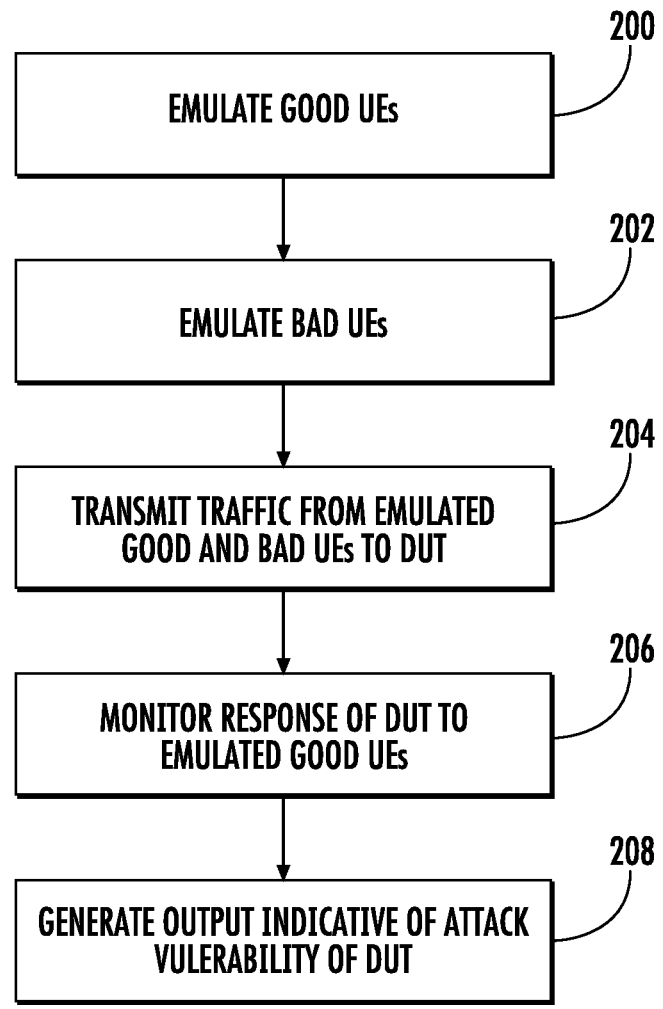
FIG. 2 is a flow chart illustrating an exemplary process for emulating good and bad UEs and assessing the attack vulnerability of an air interface device under test according to an embodiment of the subject matter described herein.

FIG. 2 is a flow chart illustrating an exemplary process for assessing the attack vulnerability of network equipment according to an embodiment of the subject matter described herein. Referring to FIG. 2, in step 200, one or more good UEs are emulated. For example, good UE emulator 108 may emulate one or more good UEs by configuring the UEs to attach to the network, request bandwidth, and download a file. After downloading the file, the good UEs may detach from the network. In another example, the good UEs may initiate voice calls for a predetermined duration followed by detaching from the network.

In step 202, one or more bad UEs are emulated. For example, network equipment test device 102 may emulate one or more UEs with a hacked application and/or a hacked protocol stack that connects to device under test 100 and behaves in a manner designed to consume resources of the device under test 100 at the expense of other UEs. For example, when emulating a bad UE with a hacked application, bad UE emulator 110 may attach to the network, reserve bandwidth, and either use or refrain from using the reserved bandwidth, depending on the attack scenario.

In step 204, traffic is transmitted from the emulated good and bad UEs to the device under test. For example, good UE emulator 108 and bad UE emulator 110 may transmit traffic according to their respective configurations to device under test 100. The traffic may include signaling traffic, data traffic, and/or voice call traffic. In LTE networks, bandwidth reservation grants may be monitored by capturing and decoding resource reservation information provided by the eNode B to the UEs as downlink control information on the downlink control channel. The traffic may be transmitted over a wired or wireless interface to device under test 100. In one embodiment, a wired interface, such as a common public radio interface (CPRI) may be used to carry LTE radio access network traffic between network equipment test device 102 and device under test 100. In an alternate implementation, traffic may be communicated over the air between network equipment test device 102 and device under test 100.

In step 206, a response of the device under test to the emulated good UEs is monitored. For example, attack vulnerability assessment module 112 may monitor bandwidth reservation grants made by device under test 100 and during and before or after the attack. Attack vulnerability assessment module 112 may monitor bandwidth reservation grants made by device under test 100 to good UEs to determine the effect of the bandwidth reservations requested by the bad UEs on good UEs. Attack vulnerability assessment module 112 may also monitor bandwidth reservation grants to bad UEs.

In step 208, output indicative of the attack vulnerability of the device under test is generated. For example, attack vulnerability assessment module 112 may generate a graph or other indicator of resources available from device under test 100 during the attack and before or after the attack. In one example, the output indicative of attack vulnerability may illustrate bandwidth available to the good UEs before or after and during the attack. In another example, the output indicative of the attack vulnerability may indicate a number of dropped calls during the attack. In another example, the number of denied network attachments during the attack may be indicated. In yet another example, voice call quality before or after and during the attack may be indicated. If voice call quality is measure, network equipment test device 102 may determine a mean opinion score (MOS) or other suitable indication of voice call quality during the attack and before or after the attack. If the MOS during the attack is less than the MOS before or after the attack, network equipment test device 102 may determine that device under test 100 is vulnerable to attack and generate output indicating the difference between the MOS scores during versus before or after the attack.

Figure 3:
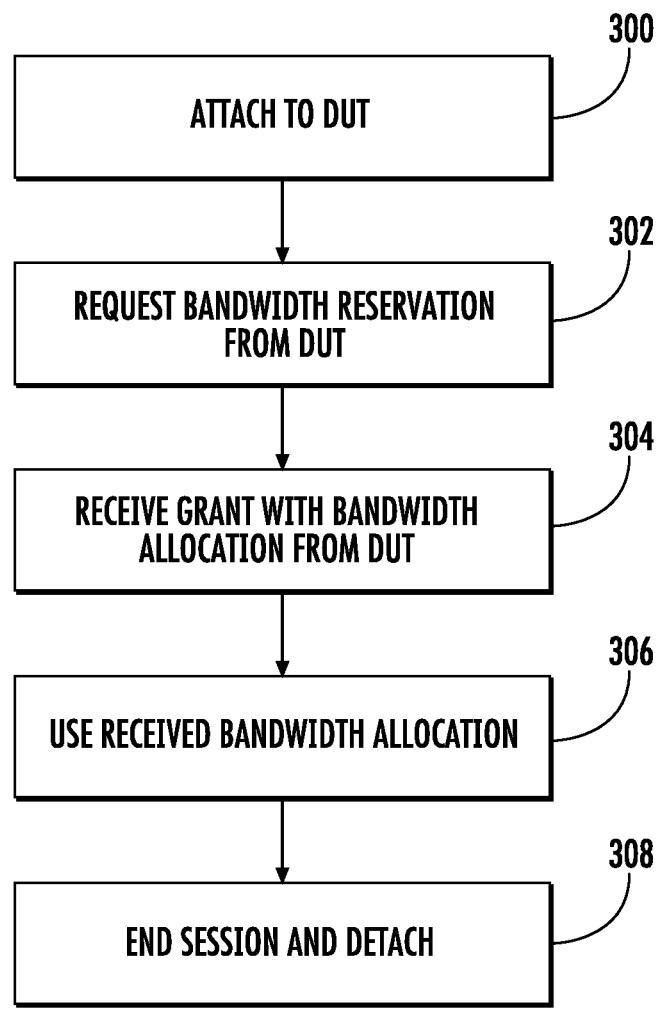
FIG. 3 is a flow chart illustrating an exemplary process for emulating a good UE according to an embodiment of the subject matter described herein.

FIG. 3 is a flow chart illustrating an exemplary process for emulating a good UE according to an embodiment of the subject matter described herein. Referring to FIG. 3, in step 300, the good UE attaches to the network. For example, good UE emulator 108 may emulate a good UE by sending an attach request to device under test 100 requesting attachment to the network. The attach request may include subscriber and/or device identifier information that device under test 100 will recognize as a legitimate access to the network.

Once the attach request is granted, in step 302, a bandwidth reservation is requested for a session. For example, good UE emulator 108 may generate and send a bandwidth reservation request requesting an allocation of bandwidth for a video, audio, or data file download. In step 304, the emulated good UE receives a grant with a bandwidth allocation from the device under test. The bandwidth allocation may correspond to that requested by the emulated UE, provided there is sufficient bandwidth available on the radio access network for the request. In step 306, the emulated good UE may utilize the received bandwidth allocation. Utilizing the received bandwidth allocation may include downloading a file using the requested bandwidth allocation. In step 308, after the file is downloaded, the UE may end the session and detach, freeing resources on the device under test.

Figure 4:
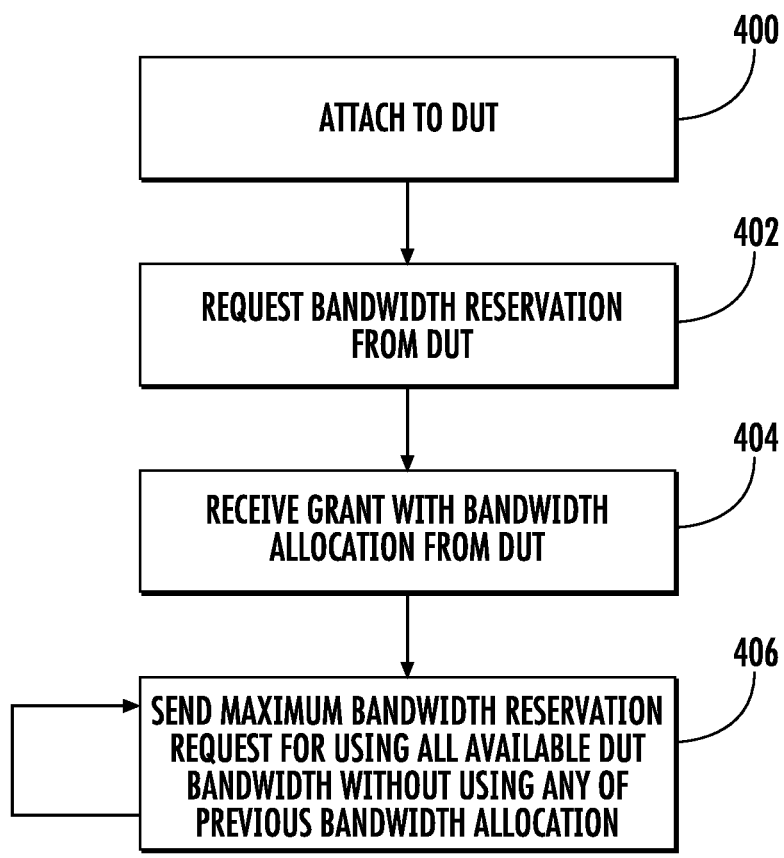
FIG. 4 is a flow chart illustrating an exemplary process for emulating a bad UE according to an embodiment of the subject matter described herein.

FIG. 4 is a flow chart illustrating an example of steps that may be performed in emulating a bad UE. Referring to FIG. 4, in step 400, the emulated bad UE attaches to the network via the device under test. Attaching to the network may include generating and sending an attach request to the device under test and receiving a corresponding grant or acknowledgment. In one example, the attach request may appear that it originates from a subscriber device authorized to attach to the network. In another example, the attach request may be of a type that is always authorized to attach to the network such as an attach request corresponding to an emergency call.

In step 402, the emulated bad UE requests a bandwidth allocation from the device under test by transmitting a bandwidth reservation request to the device under test. In step 404, the emulated bad UE receives a grant containing a bandwidth allocation from the device under test. However, in this example, rather than using the bandwidth allocation by downloading a correspondingly sized video or other file, in step 406, the emulated bad UE generates and sends a new extremely high bandwidth reservation request (maximum allowed by spec and consuming the entire available device under test bandwidth) without utilizing all of the bandwidth granted in response to the previous requests. Step 406 may be repeated a configurable number of times to emulate an attack on the device under test.

The repeated transmission of very high bandwidth reservation requests without utilizing all of the granted bandwidth may reduce the quality of service available to good UEs that are attached to the device under test. For example, one of the most important functions of an eNode B is scheduling and allocating resources to attached UEs. If most of the resources are reserved for a bad UE, then the resources available to be provided to the good UEs may be correspondingly reduced significantly. Accordingly, it is desirable to assess an eNode B's vulnerability to resource reservation based attacks so that countermeasures, such as denying repeated requests for bandwidth reservations from the same UE where the requested bandwidth is wholly or partially unused. Another countermeasure may include identifying a UE that repeatedly sends such requests as a bad UE, forcibly detaching the bad UE from the network, and dynamically blocking future attachments and/or bandwidth reservation requests from the bad UE.

In another example, emulating a bad UE may include attaching an emulated UE to the network with a modified network communications protocol stack. For example, the radio resource control layer of an emulated UE may be modified to have the UE send a flood of attach requests to the eNode B. Even if the eNode B denies the attach requests, resources on the eNode B in processing the attach requests are not available to legitimate network users. As a result, legitimate network users may be denied entry to the network. Thus, one metric of attack vulnerability of an eNode B may be generated by attack vulnerability assessment module 112 is a number or percentage of legitimate users that are denied entry to the network during an attack.

In yet another example, emulating an attack may include emulating ten UEs that attach to the network and initiate large, e.g., tens of gigabytes, data downloads simultaneously. During such an attack, attack vulnerability assessment module 112 may monitor bandwidth or other performance metric available to legitimate UEs and generate a report indicating the vulnerability of an eNode B to such an attack.

RAN Focused Threats—Approach

In another example of an attack, bad UE emulator 110 of network equipment test device 102 may emulate hacked/malware-infected UEs generating disruptive call flows to force a RAN degrade/outage. These emulated bad UEs may be designed to cripple the eNodeB with manipulated call flows that orchestrate focused RAN attacks by forcing denial of service (DoS) on legitimate users or emulated good UEs emulated by good UE emulator 108. The emulated bad UEs may operate at extremes that are within specifications or even in violation of specifications to accelerate failure conditions. Network equipment manufacturers and carriers alike share concerns in understanding the performance boundaries of the eNodeB scheduler (the brains of the RAN) and overall RAN resilience to these kinds of attacks. The following describes potential attacks that may be simulated by network equipment test device 102 and results of simulation of some of the attacks.

Modes of Attack:

Software Defined Radios: Inexpensive SDRs are currently widely available. These radio platforms can tune to a wide range of the radio spectrum (50 MHz-6 GHz on some) with bandwidths up to 20 MHz. Some support full duplex operation along with powerful ADC/DAC sampling rates and other elements conducive to building sophisticated RF devices. These hardware capabilities and affordability make it possible for a savvy hacker to integrate one of the open source 3GPP implementations (for e.g. opened) to convert these into fully functional UEs. They can then manipulate the stack at a given layer to subject one or a set of eNodeBs to highly focused and disruptive threats. Thus, good and bad UE emulators 108 and 110 may be implemented using SDR code modified for UE emulation.

NOTE: Penetrating the network: One mechanism for bypassing standard LTE authentication mechanisms is to attach to an emergency access point name (APN). A UE making an emergency call is allowed to bypass home subscriber server (HSS) authentication while also not requiring a valid international mobile station identifier/international mobile equipment identifier (IMSI/IMEI). Once attached, an SDR can manipulate signaling at any protocol layer terminating on the eNodeB to initiate an attack. Thus, bad UE emulator 110 may bypass network authentication procedures when emulating bad UEs by attaching the emulated bad UEs to an emergency APN (e.g., by dialing an emergency services directory number, such as "911" in the United States). After attaching to the emergency APN, bad UE emulator 110 may emulate any of the attacks described herein, and attack vulnerability assessment module 112 may monitor the effects on emulated good UEs as an indication of vulnerability of device under test 100.

Malware Infections creating BOTNETs: Mobile bot infections can be spread via viruses, worms, and trojans with bot capabilities sent by e-mail, embedded in seemingly legitimate apps or while browsing websites. These dormant bots on potentially thousands of infected devices can then be activated remotely and simultaneously by a "bot master" to deliver denial of service (DoS) attacks on the LTE network.

Specific Threats Defined:

The following specific examples highlight the viability of potential attacks. Two threats are explained, each orchestrated by one of the attack modes (SDR or Malware) explained above. Each example is backed by results from simulations. The DUT in these examples is an FDD macro eNodeB operating at 20 MHz bandwidth with a maximum UE capacity of 400. The UEs are simulated by network equipment test device 102 emulating good UEs and bad UEs with call flows customized to each scenario.

Threat 1: Smart Uplink Jamming (via SDR)

Malicious UEs deliberately making high fictitious data demands (requesting high layer 1 byte allocation without using it) to jam the uplink for legitimate users, thereby causing severe degradation in throughput.

Experiments were conducted to study the effects of a single hacked UE on a large number of legitimate UEs attached to a macro eNodeB. The hacked UE is designed to send continuous large Buffer Status Reports (indicating amount of buffered data). The BSRs are populated with large byte counts on Logical Channel Group 0 (mapped to the highest QoS priority). The assumption was that this would force the scheduler into diverting a majority of resources to this UE, thereby starving the legitimate users.

Use Case: 400 Normal Users and 1 Hacked UE on Macro eNodeB "X"

400 normal users attached performing FTP data upload.
After achieving steady state (equal throughputs on all UEs), a single hacked UE transmitting high BSRs is attached.

Figure 5:
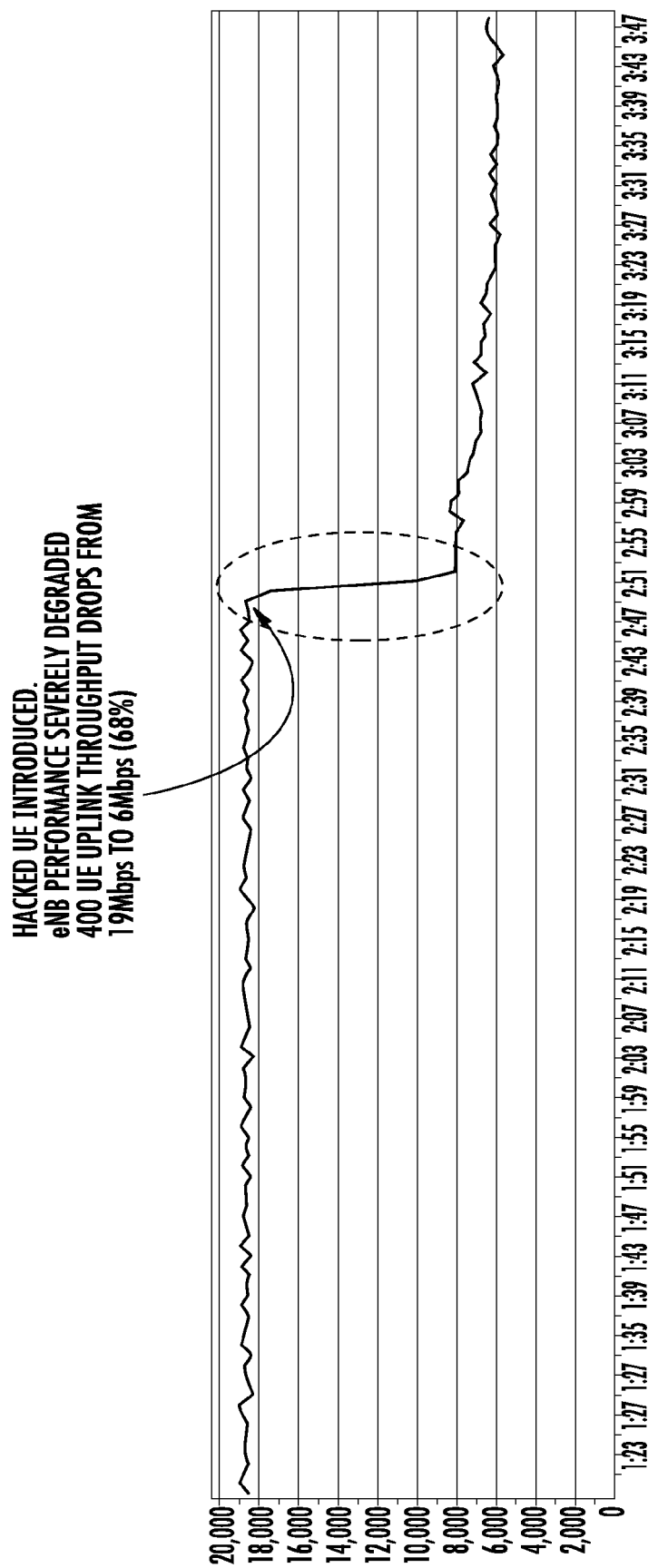
FIG. 5 is a graph illustrating indications of throughput available to good UEs before and during the attack that may be used to assess the attack vulnerability of a radio access network device under test according to an embodiment of the subject matter described herein.

In this example, the 400 emulated good UEs may be emulated by good UE emulator 108 illustrated in FIG. 1. After achieving steady state (equal throughput) on all UEs, bad UE emulator 110 may emulate a single bad or hacked UE that attaches to device under test 100 and repeatedly transmits LTE buffer status report (BSR) messages to device under test. In the illustrated example, the throughput decreases from 19 Mbps to 6 Mbps after introduction of the hacked UE into the network. A graph, such as that illustrated in FIG. 5 may be produced by attack vulnerability assessment module 112.

Another attack that may be emulated by network equipment test device 102 is a botnet triggering malicious mass downloads via one or more emulated malware infected UEs. In such an attack, bad UE emulator 110 may emulate a high number of (e.g., at or near the maximum capacity of the radio access network device being tested) malicious UEs placing extreme bandwidth stress on the eNodeB scheduler by triggering continuous downloads of large (e.g., on the order of gigabytes) data files, and consequently affecting legitimate VoLTE UEs performing voice calls.

Experiments may be conducted on a macro eNodeB to study the effects of infected UEs performing mass data downloads on a handful of legitimate VoLTE users (e.g., good UEs emulated by good UE emulator 108) that are serviced by the same eNodeB. The goal of such an experiment is to overload the scheduler with sustained, maximum cell throughput levels. The assumption is that under overloaded conditions, the continuous downloads would increase packet loss/delay, thereby impacting voice quality on the legitimate VoLTE users (measured by the Mean Opinion Score—MOS)

In one exemplary use case, the following parameters were used in evaluating the attack vulnerability of DUT 100.

Use Case: 10 VoLTE Users and 400 "Infected" UEs on Macro eNodeB "X"

Figure 6:
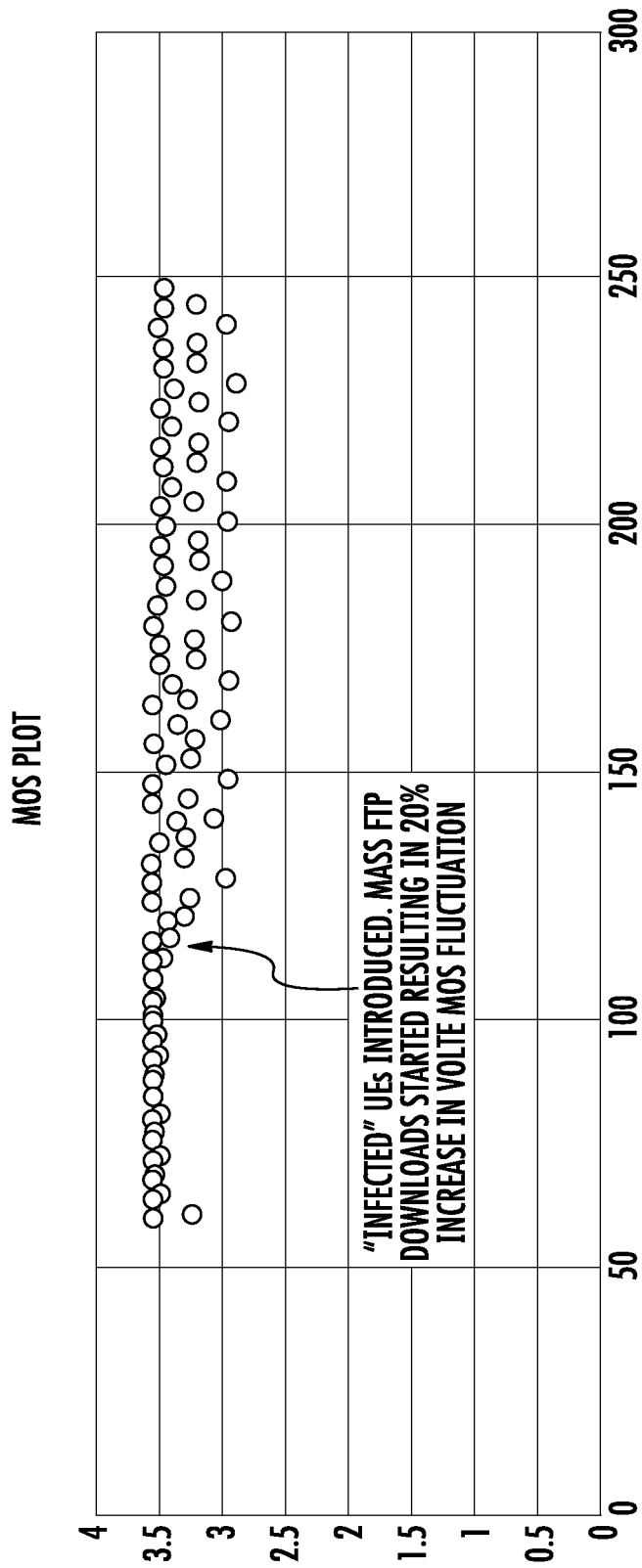
FIG. 6 is a graph illustrating variations in mean opinion scores indicating call quality experienced good UEs before and during an attack that may be used to assess the attack vulnerability of a radio access network device under test according to an embodiment of the subject matter described herein.

10 VoLTE users attached and performing voice calls
400 additional "infected" UEs attached, performing continuous FTP downloads on 10G data files (resultant average cell throughput being approximately 130 Mbps).
Observation: After the introduction of the "infected UEs" large MOS variations of up to 20% are observed (compared to the steady MOS prior). FIG. 6 is a graph illustrating the change in MOS after introduction of the infected UEs.
~This clearly indicates increased scheduler stress thereby causing voice packet jitter/delay/loss.

Other Viable Threats:

The following are some potential threats that may significantly strain the RAN and cause adverse effects on legitimate call flows. Any one or more of these threats may be emulated by network equipment test device 102 to assess the vulnerability of device under test 100 to such threats.

Signaling Storm Botnet (via SDR):

In one example, bad UE emulator 110 may overload the eNodeB with a high volume radio resource control (RRC) signaling storm. This would be achieved by coupling every Attach from an emulated bad UE with additional spoofed and randomized RRC-Connection-Request messages to exponentially increase the RRC load on the scheduler. The intense RRC stress is expected to decrease the eNodeB's call admission and handover capabilities, thereby forcing a denial of service for legitimate users. This would be a direct result of RRC connection rejects and RACH failures owed to the large signaling volumes. Thus, in the presence of an emulated signaling storm, attack vulnerability assessment module 112 may monitor the ability of good UEs to attach to the eNodeB before and during the attack.

Noise Injection BOTNET (via SDR):

Another example of an attach that may be emulated by network equipment test device 102 may be overloading the eNodeB with high malicious UE volumes emulated by bad UE emulator 110 designed to inject noise, such as additive white Gaussian noise (AWGN). The continuous influx of noise will prompt the scheduler of device under test 100 to process increased retransmission levels for the emulated bad UEs. As good UEs emulated by good UE emulator 108 eventually get dropped, they re-attach as the BOTNET emulated by bad UE emulator 110 keeps a constant level of noise-injecting UEs. This constant scheduler stress is expected to have direct impact on its abilities to service legitimate UEs. In such a test, attack vulnerability assessment module 112 may monitor the detachment and re-attachment of good UEs during the attack as an indication of vulnerability to a noise injection attack.

Thus, in one example, rather than monitoring processor utilization of the device under test, attack vulnerability assessment module 112 may determine an indication of attack vulnerability based on network resource allocations made to be emulated good UEs by the device under test. Examples of resource allocations that may be used include downlink bandwidth allocations, voice call quality, dropped calls, blocked attachments etc.

In addition, the subject matter described herein, is not limited to emulating an attack by repeatedly reserving and not using network bandwidth. Any attack that is designed to degrade network performance is intended to be within the scope of the subject matter described herein.

The subject matter described herein improves the technological fields of radio access network device testing and security. By providing a network equipment test device that emulates both good and bad UEs, monitors the response of a real device under test to the emulated good and bad UEs, and generates output indicative of attack vulnerability, the network equipment test device is a technological improvement over prior approaches that test attack vulnerability of simulated devices under test.

A network equipment test device according to the subject matter described herein solves problems in network testing and security that are necessarily rooted in computer technology. For example, the emulation of good and bad UEs, the monitoring of available resources both during and before or after an attack, and the generation of a response indicative of the attack vulnerability of a radio access network device under test solve problems specifically arising in the realm of computer networks.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:
1. A method for evaluating the attack vulnerability of a radio access network device under test, the method comprising:

at a network equipment test device:
  emulating at least one good user equipment (UE);
  emulating at least one bad UE, wherein emulating at least one bad UE includes emulating a UE with a modified radio resource control layer that causes the emulated bad UE to repeatedly generate attach requests to the device under test;
  transmitting traffic from the emulated good and bad UEs to a real radio access network device under test;
  monitoring a response of the real radio access network device under test to the emulated good UEs; and
  generating output indicative of attack vulnerability of the device under test, wherein generating output indicative of attack vulnerability of the device under test includes generating output indicative of a number or percentage of the emulated good UEs that are denied entry to the network during generation of the attach requests.

2. The method of claim 1 wherein emulating at least one good UE includes emulating a UE that attaches to the network, requests bandwidth, and utilizes the requested bandwidth.

3. The method of claim 1 wherein emulating at least one bad UE includes emulating a plurality of UEs that attach to the radio access network device under test and initiate data downloads and wherein generating output indicative of attack vulnerability includes generating output indicative of network resources available to the at least one good UE during the data downloads.

4. The method of claim 1 wherein emulating at least one bad UE includes emulating a UE with an application configured to generate an attack on the device under test.

5. The method of claim 1 wherein generating output indicative of attack vulnerability of the radio access network device under test includes generating an indication of bandwidth available to the at least one good UE before or after emulation of the at least one emulated bad UE and during the emulation of the at least one bad UE.

6. The method of claim 1 wherein the radio access network device under test comprises an eNode B.

7. The method of claim 1 wherein generating output indicative of attack vulnerability includes generating output indicative of calls dropped by the radio access network device under test or of degradation in voice call quality during an attack.

8. A method for evaluating the attack vulnerability of a radio access network device under test, the method comprising:
  at a network equipment test device:
    emulating at least one good user equipment (UE);
    emulating at least one bad UE, wherein emulating at least one bad UE includes utilizing the at least one bad UE to implement a reservation-based attack on the device under test and wherein utilizing the at least one bad UE to emulate a reservation-based attack includes repeatedly sending bandwidth reservation requests to the device under test without using at least some bandwidth granted in response to previous requests;
    transmitting traffic from the emulated good and bad UEs to a real radio access network device under test;
    monitoring a response of the real radio access network device under test to the emulated good UEs; and
    generating output indicative of attack vulnerability of the device under test.

9. A system for evaluating the attack vulnerability of a radio access network device under test, the system comprising:
  a network equipment test device, including:
    a good UE emulator for emulating at least one good user equipment (UE);
    a bad UE emulator for emulating at least one bad UE, wherein the at least one emulated bad UE includes a modified radio resource control layer that causes the at least one emulated bad UE repeatedly generates attach requests to the device under test, wherein the network equipment test device transmits traffic from the emulated good and bad UEs to a real radio access network device under test; and
    an attack vulnerability assessment module for monitoring a response of the real radio access network device under test to the emulated good and generating output indicative of attack vulnerability of the device under test, wherein the attack vulnerability assessment module generates output indicative of a number or percentage of the emulated good UEs that are denied entry to the network during generation of the attach requests.

10. The system of claim 9 wherein the at least one emulated good UE attaches to the network, requests bandwidth, and utilizes the requested bandwidth.

11. A system for evaluating the attack vulnerability of a radio access network device under test, the system comprising:
  a network equipment test device, including:
    a good UE emulator for emulating at least one good user equipment (UE);
    a bad UE emulator for emulating at least one bad UE, wherein the at least one emulated bad UE implements a reservation-based attack on the device under test, wherein the reservation-based attack includes repeatedly sending bandwidth reservation requests to the device under test without using at least some bandwidth granted in response to previous requests, and wherein the network equipment test device transmits traffic from the emulated good and bad UEs to a real radio access network device under test; and
    an attack vulnerability assessment module for monitoring a response of the real radio access network device under test to the emulated good and generating output indicative of attack vulnerability of the device under test.

12. The system of claim 9 wherein the bad UE emulator emulates a plurality of UEs that attach to the radio access network device under test and initiate data downloads and wherein the attack vulnerability assessment module generates output indicative of network resources available to the at least one good UE during the data downloads.

13. The system of claim 9 wherein the bad UE emulator emulates a UE with an application configured to generate an attack on the device under test.

14. The system of claim 9 wherein the attack vulnerability assessment module generates an indication of bandwidth available to the at least one good UE before or after emulation of the at least one bad UE and during the emulation of the at least one bad UE.

15. The system of claim 9 wherein the radio access network device under test comprises an eNode B.

16. The system of claim 9 wherein the attack vulnerability assessment module generates output indicative of calls dropped by the radio access network device under test or of degradation in voice call quality during an attack.

17. A non-transitory computer readable medium having stored thereon executable instructions that when executed by a processor of a computer control the computer to platform steps comprising:
  at a network equipment test device:
    emulating at least one good user equipment (UE);
    emulating at least one bad UE, wherein emulating at least one bad UE includes emulating a UE with a modified radio resource control layer that causes the emulated bad UE to repeatedly generate attach requests to the device under test;
    transmitting traffic from the emulated good and bad UEs to a real radio access network device under test;
    monitoring a response of the real radio access network device under test to the emulated good UEs; and
    generating output indicative of attack vulnerability of the device under test, wherein generating output indicative of attack vulnerability of the device under test includes generating output indicative of a number or percentage of the emulated good UEs that are denied entry to the network during generation of the attach requests.

* * * * *